Patented July 14, 1942

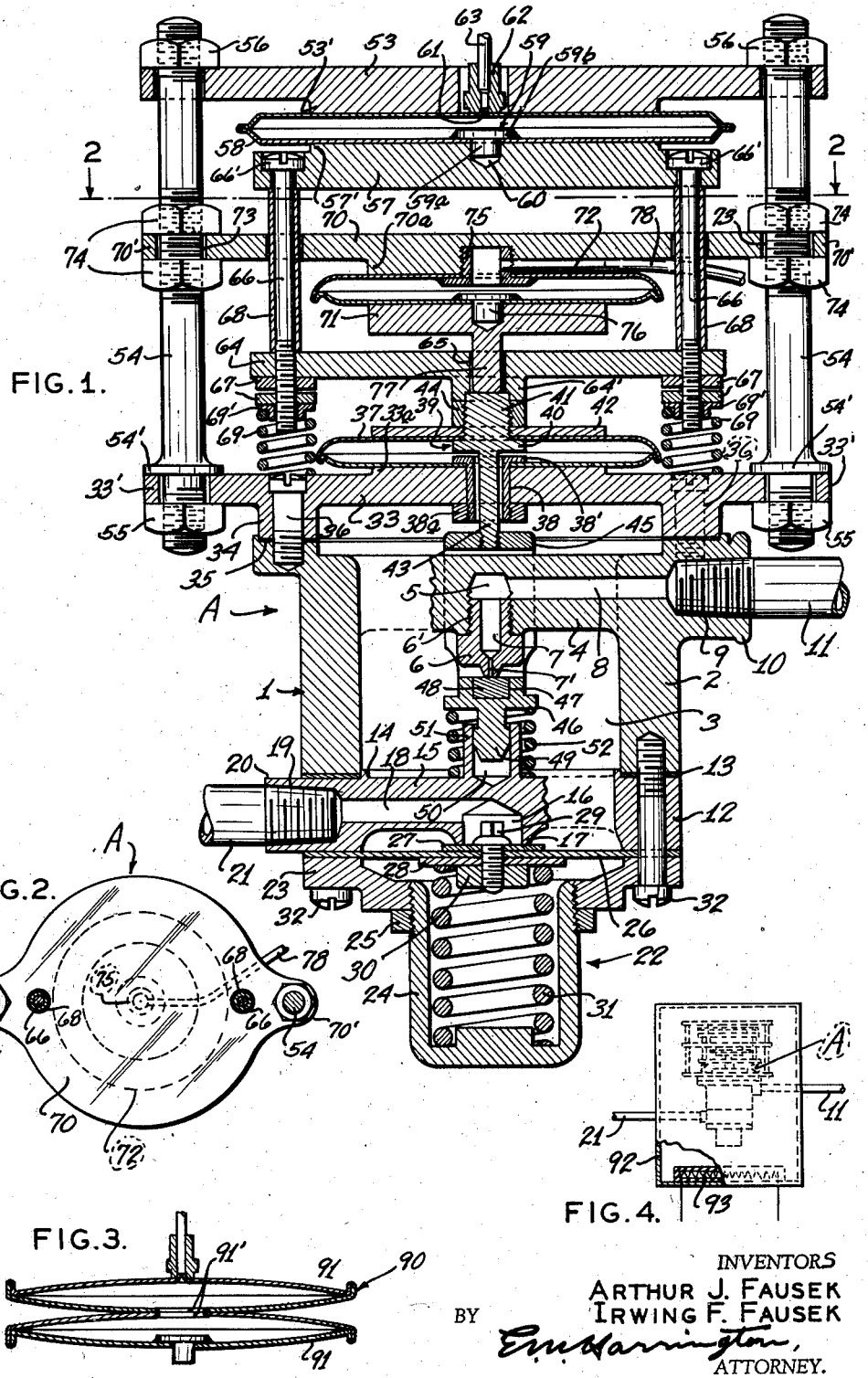

2,289,639

UNITED STATES PATENT OFFICE 2,289,639

OXYGEN DELIVERY APPARATUS

Arthur J. Fausek and Irwing F. Fausek, Clayton, Mo.

Application December 23, 1940, Serial No. 371,228

7 Claims. (Cl. 128—204)

This invention relates generally to oxygen delivery apparatus and more specifically to apparatus of this type adapted for use in regulating the flow of oxygen to aviators and other persons flying in aircraft at high altitudes, the predominant object of the invention being to provide an improved oxygen delivery apparatus which is so constructed and arranged that it is capable of automatically regulating the delivery of oxygen to occupants of aircraft in accordance with the pressures of the atmosphere at various high altitudes at which an aircraft equipped with the improved apparatus is being flown.

As is generally known to persons familiar with such matters, aircraft designed or intended for use in flying at very high altitudes are provided with oxygen tanks from which oxygen is supplied to occupants of such aircraft when higher altitudes are reached where there is a deficiency of oxygen. Prior to this invention delivery of oxygen to occupants of aircraft flying at very high altitudes was generally regulated by valves which were manually actuated by the occupants of aircraft to whom the oxygen was being delivered. However, experience of aviators in flying at very high altitudes has proved that a state approaching unconsciousness resulting from a deficiency of oxygen at high altitudes frequently occurs without warning, and when this situation is produced the aviators are deprived of their senses to the extent that they are unable to coordinate mind and body sufficiently to manually actuate oxygen delivery means. Thus, an aviator in the situation referred to will, because of the deficiency of oxygen, becomes unconscious with the result that his aircraft will crash unless he is fortunate enough to revive as his descent carries him into lower altitudes while sufficient time remains for him to regain control of the aircraft.

The prime purpose of this invention is to provide an improved oxygen delivery apparatus for controlling and regulating the delivery of oxygen to occupants of aircraft being flown at high altitudes which is automatically actuated in accordance with the various pressures of the atmosphere at different high altitudes in which the aircraft equipped with the improved oxygen delivery apparatus is being flown. In other words, the oxygen delivery apparatus of the present invention is capable of being set to deliver a predetermined volume of oxygen at a certain altitude and as the altitude of the aircraft with which the apparatus is associated is increased the reduced pressure of the atmosphere at such higher altitudes will result in automatic actuation of the oxygen delivery apparatus to increase the volume of oxygen delivered by the apparatus to compensate for the deficiency of oxygen in the rarefied atmosphere at the higher altitudes attained by the aircraft. Thus, occupants of aircraft equipped with oxygen delivery apparatus of the type disclosed herein are assured of the delivery to them of the proper amount of oxygen at various high altitudes without requirement of any manual activity on their parts to bring this situation about.

Fig. 1 is a vertical section of the improved oxygen delivery apparatus.

Fig. 2 is a horizontal section, on a reduced scale, taken on line 2—2 of Fig. 1.

Fig. 3 is a fragmentary sectional view illustrating a modified form of diaphragm which may be employed as a part of the improved apparatus.

Fig. 4 is a view on a reduced scale showing the improved apparatus enclosed within a housing wherein heat is produced whereby extremely low temperatures are prevented from affecting the operation of the apparatus.

In the drawing, wherein are shown for the purpose of illustration, merely, two embodiments of the invention, A designates the improved oxygen delivery apparatus generally. The apparatus A includes a pressure regulator 1 which is provided with a body portion 2 wherein a chamber 3 is formed. Forming a part of the body portion 2 and extended transversely with respect thereto adjacent to the upper end thereof is a bridge portion 4, said chamber 3 being open at the upper end of the body portion 2 at opposite sides of said bridge portion 4. Formed in the bridge portion 4, preferably at the approximate longitudinal center thereof, is a cavity 5, said cavity being open at the lower portion of the bridge portion and its wall being provided with screwthreads throughout its lower portion.

Associated with the cavity 5 is a nozzle 6 that includes a screwthreaded portion 6' which is screwthreadedly extended into the screwthreaded lower portion of said cavity, said nozzle having an opening 7 formed therein which terminates in a reduced discharge orifice 7'. Formed longitudinally through the bridge portion 4 is an oxygen inlet passageway 8 which communicates at its inner end with the cavity 5 and at its oposite, or outer, end with an opening 9 formed in an extension 10 formed on the body portion 2 of the pressure regulator 1, the wall of said opening 9 being screwthreaded and said opening receiving a screwthreaded end portion of an oxygen conductor 11 by which oxygen is conducted from a source of supply to the pressure regulator 1.

Arranged at the lower end of the body portion 2 of the pressure regulator 1 is a member 12 which includes a marginal rim that is secured to the lower portion of the wall of said body portion by suitable fastening devices which will be hereinafter referred to, there being a suitable gasket 13 interposed between the lower edge of the wall of the body portion 2 of the pressure regulator 1 and an adjacent face of the member 12 to provide a gas-tight joint between these parts. Also the member 12 is provided with an upstanding flange 14 with which the inner edge of the gasket contacts and which engages the extreme lower portion of the inner face of the wall of the body portion 2. The member 12 includes also a bridge portion 15 which extends transversely from one to the opposite side of the rim portion thereof, said bridge portion having a cavity 16 formed therein at the approximate longitudinal center thereof which cavity is formed partially within the bridge portion proper and partially within a downwardly projected extension 17 formed on said bridge portion and which cavity is open at the lower end of said extension. Formed in the bridge portion 15 and extended longitudinally thereof is an outlet passageway 18 which communicates at its inner end with the cavity 16 and at its opposite end with an opening 19 formed partially within the bridge portion 15 and partially in an extension 20 projected outwardly from the member 12, the wall of said opening being screwthreaded and said opening receiving the screwthreaded end portion of an oxygen delivery conductor 21.

Secured to the member 12 at the lower end thereof is a closure structure 22 which serves to close the lower portion of the pressure regulator 1, said closure structure 22 including an annular element 23 having a centrally located opening the wall of which is screwthreaded, a cap 24 having an upper, externally screwthreaded portion which is screwthreadedly disposed within said screwthreaded opening of said annular element 23, and a lock nut 25 which serves to prevent unintended rotation of said cap 24 with respect to the element 23. Arranged at the point of junction between the member 12 and the element 23 is a diaphragm 26 whose marginal edge portion is interposed between adjacent faces of said member 12 and said element 23. The diaphragm 26 constitutes the bottom wall of the chamber 3 of the pressure regulator 1 and said diaphragm is provided with a plate 27 which is disposed at its upper face and is adapted to contact with the lower edge of the extension 17 of the bridge portion 15. At the lower face of the diaphragm a similar, but slightly larger, plate 28 is provided, and said plates 27 and 28 are fixed to the diaphragm 26 by a bolt 29 whose screwthreaded shank is extended through apertures formed through said plates and through said diaphragm and receives a nut 30 which is jambed against the plate 28 to clamp said plates in place with respect to said diaphragm. A coil spring 31 is interposed under compression between the plate 28 and the bottom wall of the cap 24, said coil spring tending to move the diaphragm upwardly so that the plate 27 is normally forced into close contact with the lower face of the extension 17 of the bridge portion 15. The member 12, the diaphragm 26, and the closure structure 22 are secured to the body portion 2 of the pressure regulator 1 by fastening elements 32, said fastening elements being extended through apertures formed through the member 12, the gasket 13, the diaphragm 26, and the element 23 of the closure structure 22, and screwthreaded upper end portions of said fastening elements being screwed into screwthreaded openings formed in the wall of said body portion 2.

Disposed at the upper end of the body portion 2 of the pressure regulator 1 is a member 33 which is of generally circular shape and is provided at opposite ends with outwardly extended ear portions 33'. The member 33 is in the form of a plate from which is extended in a downward direction an annular flange 34, there being a gasket 35 interposed between the lower face of said flange and an adjacent face of the body portion of the pressure regulator 1, and fastening elements 36 being employed to secure said member 33 to said body portion of the pressure regulator as shown in Fig. 1.

Arranged immediately above the member 33 is a bellows-type diaphragm 37, the lower portion of said diaphragm being disposed in contact with the top face of the raised portion 33a of said member 33. The lower wall of the diaphragm 37 is secured to the member 33 by a sleeve 38 which is provided with a flange 38' at its upper end, which flange contacts with the inner face of said lower wall of the diaphragm and is secured thereto, said sleeve being extended through an opening formed centrally of the member 33 and a nut 38a being screwed on the lower, externally screwthreaded portion of the sleeve and being jammed against the lower face of the member 33 to secure the diaphragm to said member 33. Secured to the upper wall of the diaphragm 37 is an element 39 which includes a flange 40 that is disposed in contact with the inner face of said upper diaphragm wall, a screwthreaded extension 41 which is projected from said flange through apertures formed through said upper wall of said diaphragm and through a plate 42 which is disposed in contact with the outer face of the upper wall of the diaphragm, and a stem 43 which projects downwardly from the flange 40 through the sleeve 38. The element 39 is secured to the upper wall of the diaphragm 37 by a nut 44 which is scewed on the screwthreaded extension 41 and is jambed against the plate 42. It is to be noted that the stem 43 of the element 39 is of much less diameter than the opening through the sleeve 38 to provide a passageway through the sleeve which places the interior of the diaphragm 37 in communication with the chamber within the body portion 2 of the pressure regulator 1.

The lower portion of the stem 43 of the element 39 is externally screwthreaded and arranged in screwthreaded engagement with said screwthreaded portion of said stem is the upper portion of a yoke 45. The yoke 45 partially embraces the bridge portion 4 of the body portion 2 of the pressure regulator 1, the opposed legs of said yoke extending downwardly at opposite sides of said bridge portion. Fixed to and supported by the lower portions of the opposed legs of the yoke 45 is an element 46 which has formed therein a cavity 47 in which is disposed an insert 48 of suitable material that provides a valve seat, said valve seat being adapted to move with the yoke 45 into and out of contact with the lower end of the nozzle 8.

The element 46 includes a lower extension 49 which projects into an opening 50 of a guiding member 51 that projects upwardly from the bridge portion 15 of the member 12, said arrangement serving to guide the yoke 45 for straight-line movement as it moves vertically under the influence of the diaphragm 37, as will be hereinafter explained. A coil spring 52 is arranged in embracing relation with respect to the guiding member 51 and contacts at its opposite ends with the bridge portion 15 and a portion of the element 46, respectively, this coil spring being intended to serve as a shock absorber and to stabilize movement of the yoke.

At the extreme upper end of the apparatus A a plate 53 is provided which is connected to the member 33 by connecting elements 54, the particular embodiment of the invention illustrated in Figs. 1 and 2 of the drawing including two of such connecting elements disposed at opposite sides of the apparatus. The connecting elements 54 are provided with flanges 54' which contact with the upper faces of the ear portions 33' of the member 33, and nuts 55 are screwed on the lower, screwthreaded portions of said connecting elements and are jambed against the lower faces of said ear portions, portions of the connecting elements being extended through openings formed through said ear portions. At their upper ends the connecting elements 54 extend through openings formed through portions of the plate 53 and nuts 56 are screwed on the screwthreaded upper end portions of said connecting elements and are jambed against portions of the top face of said plate 53.

Spaced downwardly from the plate 53 is a plate 57 and interposed between the plates 53 and 57 is a bellows-type diaphragm 58, said plates 53 and 57 being provided with extended portions 53' and 57' which contact with opposed outer faces of said diaphragm. The lower wall of the diaphragm 58 has formed therethrough, centrally thereof, an aperture through which the shank portion 59a of a centering element 59 is extended, said centering element being provided also with a flange portion 59b which contacts with the inner face of the lower wall of the diaphragm and is welded, or otherwise secured, thereto to provide a gas-tight joint between said parts. The shank portion 59a of the centering element 59 projects into an opening 60 formed in the plate 57. The top wall of the diaphragm 58 has formed therethrough, centrally thereof, an aperture 61 at which a suitable coupling 62 is welded or otherwise secured to said top diaphragm wall, said coupling serving to connect to the diaphragm a gas conductor 63 in such manner that gas may be introduced into the interior of the diaphragm. When gas has been introduced into the interior of the diaphragm 58, through the instrumentality of the coupling and conductor, to produce within the diaphragm a definite, predetermined gas pressure therein, the conductor 63 may be sealed in any suitable manner to maintain such gas pressure within the diaphragm.

Spaced a substantial distance downwardly from the plate 57 is a plate 64 which is provided with a downwardly extended boss portion 64' located approximately centrally thereof, said plate having a centrally located opening 65 formed therethrough which extends through said boss portion 64' and said opening being of slightly greater diameter at the lower end of said boss portion. The lower face of the boss portion 64' of the plate 64 contacts with the top face of the nut 44, which has been previously referred to herein, and the upper unscrewthreaded portion of the extension 41 of the element 39 is disposed in the enlarged lower portion of the opening 65 formed through the plate 64. The plates 57 and 64 are connected by bolts 66 which are provided with head portions 66' that are seated in recesses formed in the plate 57, and the lower ends of said bolts extend through apertures formed through the plate 64 and are screwthreaded to receive nuts 67 which are screwed into contact with portions of the lower face of said plate 64. Spacing of the plates 57 and 64 is maintained by sleeves 68 which embrace the bolts 66 and contact at their opposite ends with said plates 57 and 64, respectively, whereby downward movement of the plate 57 will impart like downward movement to the plate 64 because of the presence of the sleeves 68 therebetween. Also coil springs 69 are interposed between spring seats 69', which embrace lower portions of the bolts 66 and contact with the lower nuts 67, and portions of the top face of the member 33, said coil springs tending to resist downward movement of the plates 57 and 64 and serving as shock absorbers and movement stabilizers for said plates. The lower nuts 67 may be adjusted to regulate the force exerted in the coil springs 69.

Interposed between the plates 57 and 64 is a pair of spaced plates 70 and 71 between which a bellows-type diaphragm 72 is arranged. The plate 70, when viewed in plan, is of the shape shown in Fig. 2, said plate 70 having opposed ear portions 70' provided with openings 73 formed therethrough through which the connecting elements 54 extend. At the locations of the opposed ear portions of the plate 70 the connecting elements 54 are provided with screwthreaded portions on which nuts 74 are mounted and these nuts are screwed into tight contact with the opposite faces of said ear portions of said plate 70 to rigidly fix said plate to said connecting elements. The portion of the plate 70 which contacts with the top wall of the diaphragm 72 is in the form of a downwardly extended projection 70a and said top wall of the diaphragm 72 has associated with it a coupling element 75 which connects said top diaphragm wall to said plate 70. The coupling element referred to includes a flange portion which is disposed in contact with the inner face of the top wall of the diaphragm, and a screwthreaded tubular portion that extends through an opening formed through said top wall of the diaphragm and is screwed into a screwthreaded opening formed in the plate 70, said flange portion of said coupling element being welded, or otherwise secured to said top wall of the diaphragm to provide a gas-tight joint between said parts.

The lower wall of the diaphragm 72 has associated therewith a centering element 76 which includes a flange portion disposed in contact with the inner face of said lower diaphragm wall and welded, or otherwise secured, thereto to provide a gas-tight joint between the parts, and a shank portion which extends through an opening formed through the lower wall of the diaphragm and is projected into an opening formed in the plate 71. The plate 71 has formed thereon a downwardly projected extension 77 which passes through the opening 65 of the plate 64 and contacts at its lower end with the top face of the extension 41 of the element 39 associated with the diaphragm 37 and previously referred to herein. Extended through an opening formed through the projection 70a of the plate 70 and projected through an opening formed in the tubular portion of the coupling element 75, so that it communicates with the interior of said coupling element, and with the interior of the diaphragm 72, is a conductor 76. Through the instrumentality of this conductor, gas or air may be introduced into the interior of the diaphragm 72 until a predetermined gas pressure is produced within said diaphragm at which time the gas conductor 76 may be suitably sealed to maintain such gas pressure within said diaphragm.

In the use of the improved oxygen delivery apparatus disclosed herein the diaphragm 37, which is the regulator actuating diaphragm, is adopted to maintain with the chamber 3 of the regulator 1 a predetermined gas pressure, the interior of the diaphragm 37 being in communication with the chamber 3 through the sleeve 38 so that the same gas pressure is present within the chamber 3 and within the diaphragm 37. Because of this arrangement, when the pressure within the chamber 3 and diaphragm 37 drops below a predetermined pressure the upper wall of the diaphragm 37 moves downwardly with the result that the valve seat 48 will be moved, by the element 39 and the yoke 45, away from the lower end of the nozzle 6 to permit greater flow of oxygen into the chamber 3 and diaphragm 37. Also, when the pressure within the chamber 3 and the diaphragm 37 reaches the predetermined pressure the upper wall of the diaphragm 37 will be raised by the pressure within said diaphragm to elevate the valve seat 48 and thereby shut off passage of oxygen into the chamber 3 from the nozzle 6.

If however, when the improved apparatus is associated with an aircraft and is carried to high altitudes where atmosphere of reduced pressure is encountered, some means were not provided to prevent it, the greater pressure within the diaphragm 37 would overcome the reduced pressure of the atmosphere acting against the outer surface of the diaphragm 37, to move the upper wall of said diaphragm 37 upwardly to draw the valve seat against the lower end of the nozzle 6 and thereby shut off flow of oxygen into the chamber 3 at a time when a greater flow of oxygen into the chamber 3 is required.

In order to prevent the condition just mentioned, the improved apparatus includes the diaphragm 72 which functions as a compensator or equalizer. The pressure within the diaphragm 72 is approximately the same as the maximum pressure normally present within the chamber 3 and diaphragm 37 and the lower wall of said diaphragm 72 is capable of flexing downwardly when the pressure of atmosphere acting against the outer surface of the diaphragm 72 drops below the pressure within said diaphragm 72. Because of this situation the tendency of the upper wall of the diaphragm 37 to flex upwardly in atmosphere of reduced pressure is offset by the tendency of the lower wall of the diaphragm 72 to flex downwardly in atmosphere of such reduced pressure, with the result that the abutting portions 41 and 77 associated with the diaphragms 37 and 72, respectively, prevent outward flexing of both of said diaphragms. Thus the diaphragm 72 effectively prevents reduced atmospheric pressure acting against the outer surface of the diaphragm 37 from interfering with maintenance by said diaphragm 37 of a predetermined gas pressure within the chamber 3.

The improved apparatus includes still another diaphragm, the diaphragm 58, which functions as an accelerating diaphragm that acts to move the valve seat 48 in a direction away from the lower end of the nozzle 6 to insure delivery at high altitudes of the additional flow of oxygen required at such high altitudes. The diaphragm 58 has trapped therein a gas under a predetermined pressure, which, when the apparatus is carried into higher altitudes where atmospheric pressure is reduced, expands the diaphragm 58. This expansion of the diaphragm 58 moves the plate 57 downwardly and because of the interposition of the sleeves 68 between the plates 57 and 64, said plate 64 will also be moved downwardly in response to expansion of the diaphragm 58. As has been previously explained herein, the portion 64' of the plate 64 contacts with the nut 44 associated with the element 39 which is related to the diaphragm 37, and downward movement of the plate 64 will move said element 39, together with the upper wall of the diaphragm 37, downwardly with the result that the valve seat 48 will be moved away from the lower end of the nozzle 6 through the instrumentality of the stem portion 43 of the element 39 and the yoke 45, whereby greater flow of oxygen into the cavity 3 of the regulator 1 of the apparatus will be provided.

The apparatus A includes yet another diaphragm, the diaphragm 26, which controls delivery of oxygen by the apparatus through the delivery conductor 21. This diaphragm 26 has associated with it the coil spring 31 which forces the plate 27 of the diaphragm 26 against the portion 17 of the bridge portion 15 to prevent passage of oxygen through the cavity 16 and passageway 18 to the delivery conductor 21. The force exerted by the coil spring 31 against the diaphragm 26 is such that said coil spring may be flexed only by excessive gas pressure within the chamber 3 of the regulator 1 of the apparatus A. In other words, when merely a normal gas pressure is present within the chamber 3 of the regulator 1 the coil spring 31 will force the plate 27 of the diaphragm 26 tight against the extension 17 of the bridge portion 15 to close the lower end of the cavity 16 and prevent passage of oxygen to the oxygen delivery conductor 21. However, when the apparatus is carried into a higher altitude where delivery of oxygen by the apparatus is required, the accelerating diaphragm 58 functions as has been previously explained to move the valve seat away from the lower end of the nozzle 6. This increases the flow of oxygen into the chamber 3 and builds up the pressure therein to a point where it overcomes the force of the coil spring 31, whereupon the diaphragm 26 will be flexed downwardly by the increased gas pressure acting thereagainst to uncover the lower end of the cavity 16 and permit flow of oxygen from the chamber 3 through the oxygen delivery conductor 21.

In Fig. 3 is illustrated a modified form of diaphragm 90 which may be employed in the improved apparatus when a diaphragm of greater flexibility is desired. The diaphragm 90 comprises a pair of diaphragms 91 of the bellows type which are welded or otherwise secured together at their adjacent walls, said adjacent walls having alined openings 91' formed therein which place the interiors of said diaphragms in communication with each other.

Also, if desired, the apparatus A may be enclosed within a housing 92, as shown in Fig. 4, the interior of which is heated by suitable means, such, for instance, as an electrical heating element 93. This arrangement will prevent extremely low temperatures to which the apparatus may be subjected at very high altitudes from shrinking the gases and contracting metallic parts of the apparatus so as to affect proper operation of the apparatus.

We claim:

1. An oxygen delivery apparatus comprising a pressure regulator having a chamber, said pressure regulator including an oxygen inlet conductor for conducting oxygen to said chamber, an oxygen delivery conductor for conducting oxygen from said chamber, and means for controlling passage of oxygen into said chamber by way of said inlet conductor, a diaphragm for actuating said controlling means in response to change in pressure of oxygen within said chamber, an equalizing diaphragm arranged to compensate for reduced pressure of atmosphere external of the apparatus and prevent abnormal actuation of said oxygen controlling means by said controlling means actuating diaphragm because of the presence of external atmosphere of reduced pressure, and means for subjecting said oxygen controlling means to actuation in addition to the actuation to which it is subjected by said controlling means actuating diaphragm, the last-mentioned means comprising a hollow expansible diaphragm wherein a medium is trapped which tends to expand said diaphragm.

2. An oxygen delivery apparatus comprising a pressure regulator having a chamber, said pressure regulator including an oxygen inlet conductor for conducting oxygen to said chamber, an oxygen delivery conductor for conducting oxygen from said chamber, and means for controlling passage of oxygen into said chamber by way of said inlet conductor, a diaphragm for actuating said controlling means in response to change in pressure of oxygen within said chamber, an equalizing diaphragm arranged to compensate for reduced pressure of atmosphere external of the apparatus and prevent abnormal actuation of said oxygen controlling means by said controlling means actuating diaphragm because of the presence of external atmosphere of reduced pressure, means which is subjected to fixed operating pressure for subjecting said oxygen controlling means to actuation in addition to the actuation to which it is subjected by said controlling means actuating diaphragm, the last mentioned means comprising a hollow expansible diaphragm wherein a medium is trapped which tends to expand said diaphragm, and means for controlling passage of oxygen from the chamber of said pressure regulator by way of said oxygen delivery conductor.

3. An oxygen delivery apparatus comprising a pressure regulator having a chamber, said pressure regulator including an oxygen inlet conductor for conducting oxygen to said chamber, an oxygen delivery conductor for conducting oxygen from said chamber, and means for controlling passage of oxygen into said chamber, a hollow expansible diaphragm for actuating said controlling means in response to change in pressure of oxygen within said chamber, said chamber and the interior of said diaphragm being in communication with each other, an equalizing diaphragm arranged to compensate for reduced pressure of atmosphere exterior of the apparatus and prevent abnormal actuation of said oxygen controlling means because of the presence of external atmosphere of reduced pressure, said equalizing diaphragm being of the hollow expansible type and having a medium trapped therein which tends to expand the diaphragm, and means for subjecting said oxygen controlling means to actuation in addition to the actuation to which it is subjected by said controlling means actuating diaphragm.

4. An oxygen delivery apparatus comprising a pressure regulator having a chamber, said pressure regulator including an oxygen inlet conductor for conducting oxygen to said chamber, an oxygen delivery conductor for conducting oxygen from said chamber, and means for controlling passage of oxygen into said chamber, a hollow expansible diaphragm for actuating said controlling means in response to change in pressure of oxygen within said chamber, said chamber and the interior of said diaphragm being in communication with each other, an equalizing diaphragm arranged to compensate for reduced pressure of atmosphere exterior of the apparatus and prevent abnormal actuation of said oxygen controlling means because of the presence of external atmosphere of reduced pressure, said equalizing diaphragm being of the hollow expansible type and having a medium trapped therein which tends to expand the diaphragm, and means for subjecting said oxygen controlling means to actuation in addition to the actuation to which it is submitted by said controlling means actuating diaphragm, the last-mentioned means including a hollow expansible diaphragm having a medium trapped therein which tends to expand the diaphragm.

5. An oxygen delivery apparatus comprising a pressure regulator having a chamber, said pressure regulator including an oxygen inlet conductor for conducting oxygen to said chamber, an oxygen delivery conductor for conducting oxygen from said chamber, and means for controlling passage of oxygen into said chamber by way of said inlet conductor, a hollow expansible diaphragm for actuating said controlling means in response to change in pressure within said chamber, said chamber and the interior of said diaphragm being in communication with each other, an equalizing diaphragm arranged to compensate for reduced pressure of atmosphere exterior of the apparatus and prevent abnormal actuation of said oxygen controlling means because of the presence of external atmosphere of reduced pressure, said equalizing diaphragm and said controlling means actuating diaphragm having elements associated therewith which are adapted to abut whereby expansion of said equalizing diaphragm opposes abnormal expansion of said controlling means actuating diaphragm, and means including a diaphragm for subjecting said oxygen controlling means to actuation in addition to the actuation to which it is subjected by said controlling means actuating diaphragm.

6. An oxygen delivery apparatus comprising a pressure regulator having a chamber, said pressure regulator including an oxygen inlet conductor for conducting oxygen to said chamber, an oxygen delivery conductor for conducting oxygen from said chamber, and means for controlling passage of oxygen into said chamber by way of said inlet conductor, a hollow expansible diaphragm for actuating said controlling means in response to change in pressure within said chamber, said chamber and the interior of said diaphragm being in communication with each other, an equalizing diaphragm arranged to compensate for reduced pressure of atmosphere exterior of the apparatus and prevent abnormal actuation of said oxygen controlling means because of the presence of external atmosphere of reduced pressure, said equalizing diaphragm and said controlling means actuating diaphragm having elements associated therewith which are adapted to abut whereby expansion of said equalizing diaphragm opposes abnormal expansion of said controlling means actuating diaphragm, means including a diaphragm for subjecting said oxygen controlling means to actuation in addition to the actuation to which it is subjected by said controlling means actuating diaphragm, and pressure-responsive means for controlling passage of oxygen from the chamber of said pressure regulator by way of said oxygen delivery conductor.

7. An oxygen delivery apparatus comprising a pressure regulator having a chamber, said pressure regulator including an oxygen inlet conductor for conducting oxygen to said chamber, an oxygen delivery conductor for conducting oxygen from said chamber, and means for controlling passage of oxygen into said chamber by way of said inlet conductor, a hollow expansible diaphragm for actuating said controlling means in response to change in pressure within said chamber, said chamber and the interior of said diaphragm being in communication with each other, an equalizing diaphragm arranged to compensate for reduced pressure of atmosphere exterior of the apparatus and prevent abnormal actuation of said oxygen controlling means because of the presence of external atmosphere of reduced pressure, said equalizing diaphragm and said controlling means actuating diaphragm having elements associated therewith which are adapted to abut whereby expansion of said equalizing diaphragm opposes abnormal expansion of said controlling means actuating diaphragm, means including a diaphragm for subjecting said oxygen controlling means to actuation in addition to the actuation to which it is subjected by said controlling means actuating diaphragm, and pressure-responsive means comprising a diaphragm for controlling passage of oxygen from the chamber of said pressure regulator by way of said oxygen delivery conductor.

ARTHUR J. FAUSEK.
IRWING F. FAUSEK.